(12) United States Patent
De Meirleir et al.

(10) Patent No.: US 8,901,062 B2
(45) Date of Patent: Dec. 2, 2014

(54) PROCESS FOR MAKING A CRYSTALLINE STRUCTURANT COMPRISING A MOLTEN HYDROGENATED CASTOR OIL

(71) Applicant: The Procter & Gamble Company, Cincinnati, OH (US)

(72) Inventors: Niels De Meirleir, Sint-Stevens-Woluwe (BE); Walter August Maria Broeckx, Berlare (BE); Linda Pellens, Erps-Kwerps (BE)

(73) Assignee: The Procter & Gamble Company, Cincinnati, OH (US)

( * ) Notice: Subject to any disclaimer, the term of this patent is extended or adjusted under 35 U.S.C. 154(b) by 2 days.

(21) Appl. No.: 13/965,428

(22) Filed: Aug. 13, 2013

(65) Prior Publication Data

US 2014/0051622 A1    Feb. 20, 2014

(30) Foreign Application Priority Data

Aug. 15, 2012 (EP) .................................... 12180567

(51) Int. Cl.
| | | |
|---|---|---|
| *C11D 1/12* | (2006.01) | |
| *C11D 3/382* | (2006.01) | |
| *C11D 17/00* | (2006.01) | |
| *B01F 17/00* | (2006.01) | |
| *C11D 1/29* | (2006.01) | |
| *C11D 1/22* | (2006.01) | |
| *C11D 3/20* | (2006.01) | |

(52) U.S. Cl.
CPC .......... *C11D 3/2093* (2013.01); *C11D 17/0026* (2013.01); *B01F 17/0057* (2013.01); *C11D 17/0017* (2013.01); *C11D 1/29* (2013.01); *C11D 1/22* (2013.01)
USPC ........... 510/417; 510/153; 510/127; 510/208; 510/253; 510/418; 510/426; 510/432; 510/437; 510/463

(58) Field of Classification Search
USPC ......... 510/153, 127, 208, 253, 417, 418, 426, 510/432, 437, 463
See application file for complete search history.

(56) References Cited

U.S. PATENT DOCUMENTS

| | | | | |
|---|---|---|---|---|
| 2004/0200005 | A1 * | 10/2004 | Smerznak et al. | 8/115.51 |
| 2011/0065625 | A1 * | 3/2011 | Boutique et al. | 510/336 |
| 2012/0324655 | A1 * | 12/2012 | Chawla et al. | 8/137 |
| 2013/0123162 | A1 * | 5/2013 | Souter et al. | 510/295 |
| 2013/0245242 | A1 * | 9/2013 | Torres et al. | 534/794 |

OTHER PUBLICATIONS

European Search Report, application No. 12180567.5, dated May 3, 2013, containing 5 pages.

* cited by examiner

*Primary Examiner* — Charles Boyer
(74) *Attorney, Agent, or Firm* — Gregory S. Darley-Emerson; Steven W. Miller

(57) ABSTRACT

An oil-in-water emulsion comprising droplets of a molten hydrogenated castor oil, the droplets having a mean diameter of between 0.1 μm and 4 μm; and an anionic surfactant; and wherein the mean diameter is measured when the emulsion is at a temperature of between 85° C. and 95° C.

16 Claims, No Drawings

PROCESS FOR MAKING A CRYSTALLINE STRUCTURANT COMPRISING A MOLTEN HYDROGENATED CASTOR OIL

The present invention relates to crystalline structurants comprising hydrogenated castor oil for use in liquid cleaning compositions.

BACKGROUND TO THE INVENTION

Crystalline structurants are often used in liquid cleaning compositions as stabilizing and thickening agents, or in other words as structuring agents. Such systems are described in EP1328616A1. When added to a liquid composition, such as a liquid cleaning composition, these structuring agents provide a chemical network that reduces the tendency of the compositional components to coalesce and/or phase split. Hence, the structuring agents provide the liquid compositions with desired viscosity and improved shelf stability.

Often the crystalline structurants are derived from hydrogenated castor oils. The process of making the crystalline structurant comprises the steps of making an oil-in-water emulsion of the hydrogenated castor oil at elevated temperatures, and then cooling this to produce a final crystalline structurant. This final crystalline structurant is then added to the liquid cleaning composition in an amount needed to achieve a desired viscosity of the liquid cleaning composition.

However there remains considerable variability in the amount of the crystalline structurant that needs to be added to identical samples of the liquid cleaning composition in order to achieve consistent viscosity between the samples. Such variation is evident even when aliquots from a single sample of crystalline structurant are added to aliquots of a single sample of the liquid cleaning composition (i.e. the aliquots of structurant are identical and the aliquots of liquid cleaning composition are identical).

Such variability means that constant readjustment and amendment of the manufacture process is required. This is inconvenient, time consuming and costly.

Thus, there is a need in the art for a crystalline structurant that exhibits reduced variability in the quantity needed to be added to liquid cleaning compositions to achieve the desired rheological characteristics. There is also a need in the art for a convenient process to make such a crystalline structurant.

It was surprisingly found that the oil-in-water emulsions and process of the present invention achieved this.

SUMMARY OF THE INVENTION

A first aspect of the present invention is an oil-in-water emulsion comprising;
  droplets of a molten hydrogenated castor oil, the droplets having a mean diameter of between 0.1 µm and 4 µm; and
  an anionic surfactant;
and wherein the mean diameter is measured when the emulsion is at a temperature of between 85° C. and 95° C.

A second aspect of the present invention is a process for making a crystalline structurant for use in a liquid cleaning composition, wherein the process comprises the steps of;
  a) preparing an oil-in-water emulsion comprising a hydrogenated castor oil emulsion according to the first aspect;
  b) cooling the emulsion to form a crystalline structurant for use in liquid cleaning compositions.

DETAILED DESCRIPTION OF THE INVENTION

A first aspect of the present invention is an oil-in-water emulsion comprising droplets of a molten hydrogenated castor oil, the droplets having a mean diameter of between 0.1 µm and 4 µm and wherein the mean diameter is measured when the emulsion is at a temperature of between 85° C. and 95° C. The emulsion also comprises an anionic surfactant.

By oil-in-water emulsion, we herein mean a mixture of two or more immiscible liquids. In the present invention, the emulsion is characterised by droplets of molten hydrogenated castor oil in an aqueous medium. The oil-in-water emulsion may also comprise minor levels of crystalline castor oil.

The droplets can have a mean diameter of between 0.1 µm and 4 µm, or even between 0.5 µm and 4 µm, or even between 1 µm and 3.5 µm, or even between 2 µm and 3.5 µm, or even between 2.5 µm and 3 µm, when the emulsion is measured at a temperature of between 85° C. and 95° C., or even between 87.5° C. and 92.5° C., or even at 90° C. A method for measuring the mean diameter at a temperature of between 85° C. and 95° C. is described below.

It was surprisingly found that this specific mean diameter droplet size of the oil-in-water hydrogenated castor oil emulsion results in reduced variability in the amount of final crystalline structurant that needs to be added to achieve the desired rheology. Without being bound by theory, the crystalline structurant produced comprises a range of crystal shapes and sizes. It is believed that variability in crystal shape and size affects the rheology imparting abilities of the crystalline structurant. During the cooling step, the molten hydrogenated castor wax crystallizes. The process involves the formation firstly of a crystal surface followed by the transport of monomers from the oil droplet through the aqueous phase and onto the crystal surface. It is believed that the oil droplets according to the present invention have a higher solubility due to their small size. Thus, they provide reduced resistance to monomer transport from the oil droplet into the aqueous phase (due to them being more soluble in said aqueous phase), and subsequently to the crystal surface, resulting in a narrower distribution of crystal size and shape produced. Surprisingly, droplets with a larger mean diameter resulted in more variability in the final crystal type and size distribution present in the crystalline structurant between different samples (produced at different times, but with identical processing conditions and ingredients and concentrations). As a purely hypothetical example, to achieve the desired viscosity in a liquid cleaning composition, 5 g of crystalline structurant produced on one day may need to be added, but 10 g of crystalline structurant manufactured on the following day may need to be added to achieve the same desired viscosity even though all manufacturing conditions and compositional ingredients and concentrations are kept the same.

This reduction in the variability of the crystal shapes and sizes present in the crystalline structurant produced results in more consistency between different batches of crystalline structurant. The type and size of the crystals produced is also affected by the cooling rates and temperatures. Regardless of the shape and size produced, when the emulsion has a mean diameter of between 0.1 µm and 4 µm, it was surprisingly found that there is reduced variability in the different shapes and sizes present in the crystalline structurant between different samples. This results in increased consistency in the amount of crystalline structurant produced at different times that needs to be added to the liquid cleaning composition to achieve the desired viscosity.

The mean diameter is a common, well known measurement of droplet size in a liquid. It gives a mean droplet size for the total droplet population. Any suitable measuring means known in the art can be used to measure the mean diameter. The mean diameter may be measured using optical microscopy and/or image analysis. In one embodiment, the mean diameter is measured using optical microscopy. In another embodiment, the mean diameter is measured using image analysis. At droplet sizes of 0.25 μm or lower light scattering techniques such as static or dynamic light scattering techniques are used. Those skilled in the art would know how to calculate the mean diameter using standard laboratory equipment.

Those skilled in the art will know how to measure the mean diameter at a temperature of between 85° C. and 95° C. using commercially available equipment. The mean diameter of the samples of the present invention were measured using a Turbiscan LABexpert, commercially available from Formulaction, France. The measuring cell of the Turbiscan was equilibrated to at least 60° C. to inhibit cooling of the sample. The sample was then placed in the measuring cell and the mean diameter was then calculated using 'Turbiscan lab expert software' commercially available from Formulaction, France. The following parameters were entered into the Turbiscan instrument; $n_p$ (particle refractive index)=1,477; $n_f$ (fluid refractive index)=1,368; dispersed phase volume=4%. The Turbiscan instrument uses Multiple Light Scattering (MLS) and measures the photon transport mean free path, which is directly related to the ratio diameter/volume fraction. (Bru. P, Brunel L., Buron H, Cayré I., Ducarre X., Fraux A., Mengual O., Meunier G., de Sainte Marie A., (2004) Particle size and rapid stability analyses of concentrateddispersions: Use of multiple light scattering, *ACS Symposium series* 881ed T. Provder and J. Texter, 45-60.)

Castor oil is a triglyceride vegetable oil, comprising predominately ricinoleic acid, but also oleic acid and linoleic acids. When hydrogenated, it becomes castor wax, otherwise known as hydrogenated castor oil. The hydrogenated castor oil may comprise at least 85% by weight of the castor oil of ricinoleic acid. Preferably, the hydrogenated castor oil comprises glyceryl tris-12-hydroxystearate (CAS 139-44-6). In a preferred embodiment, the hydrogenated castor oil comprises at least 85%, more preferably at least 95% by weight of the hydrogenated castor oil of glyceryl tris-12-hydroxystearate. However, the hydrogenated castor oil composition can also comprise other saturated, or unsaturated linear or branched esters. In a preferred embodiment, the hydrogenated castor oil of the present invention has a melting point in the range of 45° C. to 95 ° C. Those skilled in the art will know how to prepare a hydrogenated castor oil composition having a melting point within that range. Also according to the present invention, the hydrogenated castor oil may have a low residual unsaturation and will not be ethoxylated, as ethoxylation reduces the melting point temperature to an undesirable extent. By low residual unsaturation, we herein mean an iodine value of 20 of less, preferably 10 or less, more preferably 3 or less. Those skilled in the art would know how to measure the iodine value using commonly known techniques.

The emulsion of the present invention comprises a surfactant. The surfactant acts in one instance as an emulsifying agent. Preferably, the surfactant is a detergent surfactant, i.e. a surfactant that provides detersive effect on hard surfaces or fabrics. For example a detergent surfactant may provide greasy stain or soil/clay stain removal from surfaces and/or fabrics. The surfactant can be selected from the group comprising anionic, non-ionic, cationic and zwitterionic surfactants. Although any surfactant can be used, in a preferred embodiment, the surfactant is an anionic surfactant. It was surprisingly found that if an anionic surfactant is used in the emulsion, then less final crystalline structurant needs to be added to the liquid cleaning composition to achieve the desired viscosity compared to when a non-ionic, cationic or zwitterionic surfactant is used.

In a preferred embodiment, the surfactant is an anionic detergent surfactant. Preferably, the anionic surfactant is selected from alkylbenzene sulphonate, alkyl ethoxylated sulphate and mixtures thereof.

Suitable anionic detersive surfactants include sulphate and sulphonate detersive surfactants.

Preferred sulphonate detersive surfactants include alkyl benzene sulphonate, preferably $C_{10-13}$ alkyl benzene sulphonate. Suitable alkyl benzene sulphonate (LAS) is preferably obtained by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable.

Preferred sulphate detersive surfactants include alkyl sulphate, preferably $C_{8-18}$ alkyl sulphate, or predominantly $C_{12}$ alkyl sulphate.

Another preferred sulphate detersive surfactant is alkyl alkoxylated sulphate, preferably alkyl ethoxylated sulphate, preferably a $C_{8-18}$ alkyl alkoxylated sulphate, preferably a $C_{8-18}$ alkyl ethoxylated sulphate, preferably the alkyl alkoxylated sulphate has an average degree of alkoxylation of from 0.5 to 20, preferably from 0.5 to 10, preferably the alkyl alkoxylated sulphate is a $C_{8-18}$ alkyl ethoxylated sulphate having an average degree of ethoxylation of from 0.5 to 10, preferably from 0.5 to 7, more preferably from 0.5 to 5 and most preferably from 0.5 to 3.

The alkyl sulphate, alkyl alkoxylated sulphate and alkyl benzene sulphonates may be linear or branched, substituted or un-substituted.

The crystalline structurant comprising hydrogenated castor oil according to the present invention is used as a structurant in liquid cleaning compositions. Such liquid cleaning compositions can comprise fabric care compositions such as laundry detergents, pre-treat detergents, and home care compositions. The liquid composition could be a detergent composition for fabrics or hard surfaces. The liquid composition can be in the form of a liquid, a gel or a paste. The liquid composition may also be in the form of a unit-dose enclosed in a water-soluble or insoluble film.

The present invention also contemplates a process for making a crystalline structurant.

The process comprises the steps of firstly preparing an oil-in-water emulsion comprising droplets of a molten hydrogenated castor oil, the droplets having a mean diameter of between 0.1 and 4 μm or even between 1 μm and 3.5 μm, or even between 2 μm and 3.5 μm, or even between 2.5 μm and 3 μm; and an anionic surfactant, and wherein the mean diameter is measured when the emulsion is at a temperature of between 85 and 95° C. or even between 87.5° C. and 92.5° C., or even at 90° C., followed by a second step of cooling the emulsion to make a crystalline structurant.

In an exemplary method, the oil-in-water emulsion of the present invention is made by preparing a first liquid comprising a molten hydrogenated castor oil and a second liquid comprising water and surfactant and passing them through a mixing device.

Preferably, the first liquid is at a temperature of 70° C. of higher, more preferably between 70° C. and 150° C. most preferably between 75° C. and 120° C. This temperature range is optimal to ensure that the hydrogenated castor oil is molten and so an oil-in-water emulsion is efficiently made.

However, a temperature that is too high results in discoloration of the hydrogenated castor oil and may cause the hydrogenated castor oil to boil, which ultimately results in decomposition of the hydrogenated castor oil.

Preferably, the second liquid composition comprises between 50% and 99%, more preferably between 60% and 95%, most preferably between 70% and 90% by weight of the second composition of water. The second liquid composition also comprises a surfactant. In a preferred embodiment, at least 1% by weight of the second composition, preferably 1-49% by weight of the second composition comprises a surfactant. The surfactant can be selected from the group comprising anionic, cationic, non-ionic, zwitterionic surfactants, or mixtures thereof. Preferably, the surfactant is an anionic surfactant, more preferably alkylbenzene sulphonate, most preferably linear alkylbenzene sulfonate. It should be understood that the surfactant is present in the second liquid composition at a concentration such that the emulsion produced is oil droplets present in a primarily water continuous phase, not a primarily surfactant continuous phase. Especially in the case where the crystalline structurant is added to laundry detergent compositions, high levels of surfactant in the crystalline structurant are undesirable, as they can precipitate and deposit onto fabrics. This forms a visible residue on the fabrics which is undesirable to the consumer.

The second composition can comprise a neutralizing agent. By 'neutralizing agent', we herein mean a substance used to neutralize an acidic solution. Preferably, the neutralizing agent is selected from the group comprising, sodium hydroxide, $C_1$-$C_5$ ethanolamines, or mixtures thereof. A preferred neutralizing agent is a $C_1$-$C_5$ ethanolamine, more preferably monoethanolamine.

The second composition can comprise a preservative. Preferably the preservative is an antimicrobial. The second liquid can comprise an antimicrobial selected from the 'Acticide' series of antimicrobials commercial available from Thor Chemicals, Cheshire, UK. Preferably, the antimicrobial is Acticide MBS, commercially available from Thor Chemicals, Cheshire, UK.

The ratio of hydrogenated castor oil to water can be from 1:100 to 1:10. In other words the ratio of hydrogenated castor oil to water, as the two liquid streams enter the mixing device of the present invention can be from 1:100 to 1:10.

The oil-in-water emulsion of the present invention can be prepared using any suitable mixing device. The mixing device uses mechanical energy to mix the liquids inline. Suitable mixing devices can include static and dynamic mixers. Examples of dynamic mixer devices are homogenizers, rotor-stators or high shear mixers. The mixing device could be a plurality of mixing devices arranged in series or parallel in order to provide the necessary energy dissipation rate.

In one embodiment, the oil-in-water emulsion could be prepared by passing the first and second liquids through a microchannel mixing device. Preferably, the microchannel mixing device is selected from the group comprising split and recombine mixing devices or staggered herringbone mixers. In a preferred embodiment, the micro-channel mixing device is a split and recombine mixing device. Microchannel mixing devices are a class of static mixers.

Preferably, the mixing device has an Energy Dissipation rate between 0.1 and 10,000 kW/kg, to form an oil-in-water emulsion. Those skilled in the art will know how to measure the Energy Dissipation rate. Briefly, in a continuous process comprising a static emulsification device, the energy dissipation rate is calculated by measuring the pressure drop over the emulsification device, and multiplying this value by the flow rate, and then dividing by the active volume of the device. In the case where an emulsification is conducted via an external power source, such as a batch tank or high shear mixer, the energy dissipation is calculated via the following Formula 1 (Kowalski, A. J., 2009., Power consumption of in-line rotor-stator devices. Chem. Eng. Proc. 48, 581.);

$$P_f = P_T + P_F + P_L, \quad \text{Formula 1}$$

Wherein $P_T$ is the power required to rotate the rotor against the liquid, $P_F$ is the additional power requirements from the flow of liquid and $P_L$ is the power lost, for example from bearings, vibration, noise etc.

Preferably, the first liquid and the second liquid are passed into the mixing device at a temperature of between 70° C. and 150° C. preferably between 75° C. and 120° C. This temperature range is optimal to ensure that the hydrogenated castor oil is molten and so an oil-in-water emulsion is efficiently made. However, a temperature that is too high results in discoloration of the hydrogenated castor oil and may cause the hydrogenated castor oil to boil, which ultimately results in decomposition of the hydrogenated castor oil. In a preferred embodiment, the first liquid stream and the second liquid stream are passed into the mixing device at a temperature of between 82° C. and 99° C. This is most optimal to ensure melting of hydrogenated castor oil, without causing it to boil. Preferably, the first liquid stream and the second liquid stream are kept at a temperature of between 82° C. and 99° C. as they pass through the mixing device.

Without being bound by theory, it is believed that the oil-in-water emulsions of the present invention, made using the process of the present invention increase the efficiency of the crystal growth in later steps.

In a second step the oil-in-water emulsion is cooled to form a crystalline structurant. Preferably, the crystalline structurant is collected at a temperature of 75° C. or less, more preferably between 45° C. or less, most preferably 35° C. or less. The oil-in-water emulsion can be allowed to cool to form the crystalline structurant (as a dispersion in the aqueous phase). This crystalline structurant or the aqueous dispersion can then be added to the liquid cleaning composition. Alternatively, the oil-in-water emulsion when exiting the mixing device at a temperature of between 82° C. and 99° C. can be added directly to the liquid cleaning composition. In this embodiment, the crystallization process occurs in the liquid cleaning composition itself as the oil-in-water emulsion cools.

The oil-in-water emulsion can be cooled by optionally passing it through a heat exchanger device. Preferably, the heat exchanger device is selected from the group comprising, plate and frame heat exchanger and shell and tube heat exchangers.

Optionally, the oil-in-water emulsion can be passed through a more than one heat exchanger device. In this case the second and subsequent heat exchanger devices would be arranged in series with respect to first heat exchanger. Such arrangement of heat exchanger devices may be preferable to control the cooling profile of the oil-in-water emsulsion. Different cooling profiles result in the production of different crystal sizes and shapes.

The process can be a continuous process. By being continuous, down-time between runs is reduced resulting in a more cost and time efficient process.

By 'batch processes' we herein mean where the process goes through discrete and different steps. The flow of product through the apparatus is interrupted as different stages of the transformation are completed, i.e. discontinuous flow of material.

By 'continuous process' we herein mean continuous flow of the material through the apparatus.

Without being bound by theory, it is believed that the use of a continuous process provides improved control of the droplet size in the oil-in-water emulsion, and thus more efficient production of droplets having a mean diameter of between 0.1 µm and 4 µm as compared to a batch process. Batch production of the oil-in-water emulsion generally results in larger variation of the droplet size produced due to the inherent variability in the degree of mixing occurring within the liquid being mixed in the batch tank. Dependent for example on the placement of the mixing paddle within a batch tank, it will result in zones of slower moving liquid (and hence less mixing resulting in larger droplets) and zones of faster moving liquid (and hence more mixing and smaller droplets). Thus, this results in a large variability in droplet sizes. Those skilled in the art will know how to select appropriate mixing devices to enable a continuous process. Furthermore, a continuous process will allow for faster transfer of the oil-in-water emulsion to the cooling step. If control over the cooling profile is required, then the continuous process will allow for reduction in premature cooling that could occur in a batch tank before transfer to the cooling step.

EXAMPLES

The variability of crystalline wax ester comprising hydrogenated castor oil made using traditional batch processes and the same product made using the process of the present invention was compared.

Three separate 7 ton batches of crystalline wax ester comprising hydrogenated castor oil made using a traditional batch process were prepared. All batches were prepared on the same unit on the same day and all produced with the same hydrogenated castor oil. Samples were taken of the emulsions made in the first and second batches and mean diameter size of the droplets measured using the method described earlier. The mean diameter of the first sample was 8.5 µm and the second was 10.5 µm. To determine the variability of the three batches, 100 g of the samples were diluted with 900 g base premix (16.7 w/w % HLAS 3.34 w/w % monoethanolamine and 79.96 w/w % water) and the rheological response of each of the sample/base mixes was measured using parallel plate fixtures on an Anton Paar MCR 302 rheometer (Anton Paar GmbH-AUSTRIA). The radius of the plates were 40 mm. The gap separation used was 0.750 mm. The temperature control is provided through a Peltier plate system, which is accurate to within 0.1° C., and temperature is maintained at 20° C. In all experiments the fluid was carefully loaded between the two plates to avoid air bubbles, and the excess fluid removed to ensure a smooth cylindrical interface. After the sample is loaded and the upper plate lowered to the specified gap, the sample is submitted to an oscillation with a frequency of 1 Hz and an amplitude of 1 mNm for 120 s to equilibrate at the specified temperature. In a second step the samples were subjected to shear rates from 0.1 to 30 s$^{-1}$, in 160 logarithmic steps. Each shear step was maintained for 1.875 s. In the table below, the apparent viscosity at a shear of 20.22 s$^{-1}$ is reported. Thus, the crystalline structurant was used to thicken the base premix.

Crystalline wax ester comprising hydrogenated castor oil was prepared in a continuous process according to the present invention using an Ehrfeld micro split and recombine reactor. The cooling step was conducted at a temperature of 50° C., a residence time of 403 s, the heat exchanger device used having a channel diameter of 1.7 mm. Two samples of the emulsion were collected; the first sample having a mean diameter size of the droplet of 2.8 µm and the second 2.7 µm. Two final product samples were taken at different times. The viscosity was again determined at a shear rate of 20.22 s$^{-1}$ with an Anton paar MCR as detailed above of 100 g of sample diluted with 900g base premix.

In both production methods, the fluid and second liquids were prepared in an identical manner, passed into the mixing device at the same temperature and passed into the cooling step at the same temperature.

The results are shown in Tables 1.

TABLE 1

|  | Sample 1 viscosity in mPas | Sample 2 viscosity in mPas | Sample 3 viscosity in mPas | Coefficient of Variation |
|---|---|---|---|---|
| Traditional Batch process | 1374 | 1350 | 1129 | 10.52 |
| Process of present invention | 945.4 | 944.5 | 936 | 0.55 |

The coefficient of variation is the standard deviation divided by the mean. As can be seen from Table 1, when 100 g of different crystalline structurants were diluted in 900 g of base premix and the viscosity of the mixture measured, there was a coefficient of variation of 10.52. However, when the test was repeated with samples made using the process of the present invention from emulsions according to the present invention, there was a coefficient of variation of only 0.55. Thus, there is less variability between samples of crystalline structurants made using the process of the present invention, and hence more consistency in viscosity achieved using the same quantity of structurants made at different times.

The dimensions and values disclosed herein are not to be understood as being strictly limited to the exact numerical values recited. Instead, unless otherwise specified, each such dimension is intended to mean both the recited value and a functionally equivalent range surrounding that value.

For example, a dimension disclosed as "40 mm" is intended to mean "about 40 mm".

The invention claimed is:

1. An oil-in-water emulsion comprising:
   droplets of a molten hydrogenated castor oil, the droplets having a mean diameter of between about 0.1 µm and about 4 µm; and
   an anionic surfactant;
   and wherein the emulsion is at a temperature of between about 85° C. and about 95° C.

2. The oil-in-water emulsion according to claim 1, wherein the mean diameter is between about 0.5 µm and about 4 µm.

3. The oil-in-water emulsion according to claim 1, wherein the mean diameter is between about 1 µm and about 3.5 µm.

4. The oil-in-water emulsion according to claim 1, wherein the mean diameter is between about 2 µm and about 3.5 µm.

5. The oil-in-water emulsion according to claim 1, wherein the mean diameter is between about 2.5 µm and about 3 µm.

6. The oil-in-water emulsion according to claim 1, wherein the anionic surfactant is a detersive surfactant.

7. The oil-in-water emulsion according to claim 6, wherein the anionic surfactant is selected from alkylbenzene sulphonate, alkyl ethoxylated sulphate and mixtures thereof.

8. A process for making a crystalline structurant, wherein the process comprises the steps of;
   a) preparing an oil-in-water emulsion comprising a hydrogenated castor oil according to claim 1;

b) cooling the emulsion to form a crystalline structurant comprising hydrogenated castor oil.

9. The process of claim 8, wherein the process is continuous.

10. The process of claim 8, wherein the oil-in-water emulsion is prepared by passing a first liquid stream comprising molten hydrogenated castor oil and a second liquid stream comprising water and anionic surfactant into a mixing device at a temperature of between about 70° C. and about 150° C.

11. The process according to claim 10, wherein the temperature is between about 75° C. and about 120° C.

12. The process according to claim 10, wherein the ratio of hydrogenated castor oil to water is from 1:100 to 1:10 as the streams pass into the mixing device.

13. The process according to claim 8, wherein in step b), the emulsion is passed through a heat exchanger device.

14. The process according to claim 13 wherein the heat exchanger device is selected from the group comprising, plate and frame heat exchanger and shell and tube heat exchangers.

15. The process according to claim 13, wherein the emulsion is passed through at least two heat exchanger devices in series.

16. A crystalline structurant comprising hydrogenated castor oil, wherein said crystalline structurant is formed by the process of a) preparing an oil-in-water emulsion at a temperature of between about 85° C. and about 95° C., wherein said emulsion comprises droplets of a molten hydrogenated castor oil, wherein said droplets have a mean diameter of between about 0.1 μm and about 4 μm, and wherein said emulsion further comprises anionic surfactant; and b) cooling the emulsion to form said crystalline structurant comprising hydrogenated castor oil.

* * * * *